Nov. 29, 1966  H. R. DOHRING  3,287,979
BALANCING SYSTEM
Filed June 25, 1964

INVENTOR.
Howard R. Dohring
BY
Hugh L. Fisher
ATTORNEY

United States Patent Office 3,287,979
Patented Nov. 29, 1966

3,287,979
BALANCING SYSTEM
Howard R. Dohring, Southfield, Mich., assignor to General Motors Corporation, Detroit, Mich., a corporation of Delaware
Filed June 25, 1964, Ser. No. 377,819
9 Claims. (Cl. 73—483)

This invention relates to systems for determining dispositions of bodies and is particularly suited, although not exclusively, for determining the unbalance in a workpiece.

The invention comprehends a new and different way for determining the location of a member relative to a certain reference by developing pressure differentials reflecting the disposition. Somewhat more specifically contemplated is the determination of the angular position of a universally pivotal member by developing a series of pressures each reflecting the amount of tilt of the member at selected points and then comparing these pressures for ascertaining the angular disposition of the member and the amount of deflection.

Another purpose of the invention is to provide a unique arrangement for determining the static unbalance in a workpiece. By the arrangement the angular disposition of a universally pivotal supported workpiece causes corresponding pressures to be developed at selected points each relating to the disposition of the workpiece. These pressures are sensed and compared to determine the amount of unbalance in the workpiece and its angular location.

Figure 1:
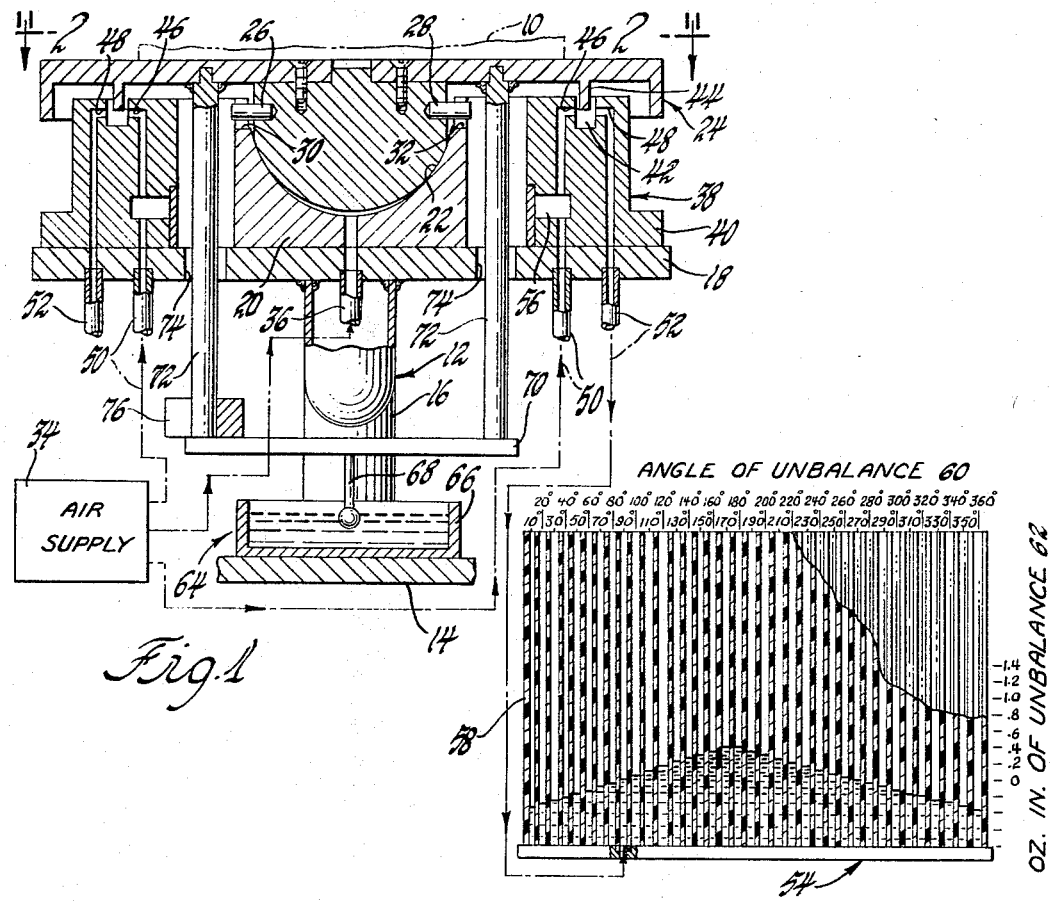
Figure 2:
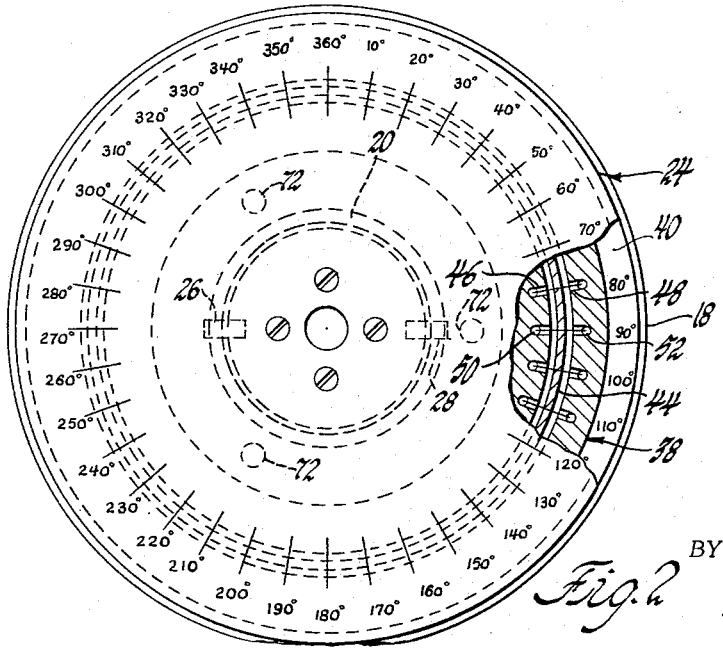

The foregoing and other objects and advantages of the invention will become apparent from the following description and the accompanying drawings, in which:

FIGURE 1 illustrates schematically apparatus incorporating the principles of the invention; and FIGURE 2 is a view of the apparatus looking in the direction of arrows 2—2 in FIGURE 1.

Referring now to the drawings in detail and initially to FIGURE 1, the numeral 10 denotes a workpiece and the numeral 12 generally designates a support for permitting universal pivotal movement of the workpiece 10. When mounted on this support 12, the heavy side of the workpiece 10 and the cause of static unbalance will produce a tilting movement that can be accurately measured, as will become apparent.

The support 12 includes a base 14 on which is mounted an upright vertical column 16. The vertical column 16 at its upper end fixedly supports a horizontal upper platform 18 and a spherical socket 20. This spherical socket 20 is suitably secured to the horizontal upper platform 18 and provides a seat for a half-ball 22. The half-ball 22 is in turn coaxially aligned with and secured to a mounting plate 24. Hence, the mounting plate 24 has universal pivotal movement on the seat provided by the spherical socket 20. Rotation of the mounting plate 24 in a horizontal plane relative to the socket 16 is prevented by the coaction of the two dowels 26 and 28, which are press fitted into opposite sides of the half-ball 22 and two socket slots 30 and 32, which respectively receive the dowels 26 and 28.

Preferably, some fluid pressure medium, as air under pressure from an air supply 34 is delivered to the seat of the socket 20 via a supply passage 36 so as to provide a relatively friction free air bearing for the mounting plate 24.

The disposition of the mounting plate 24 is detected by a movement sensor, denoted generally by the numeral 38. The movement sensor 38 utilizes a fluid pressurized medium, preferably air from the supply 34 for the mentioned air bearing. The pressure of this air can be controlled, if required, by an suitable pressure regulating valve, not shown. The movement sensor 38 includes an annular transfer ring 40 coaxially aligned on and affixed to the upper horizontal platform 18. An annular chamber 42 is provided in the upper end of the transfer ring 40 and opens upwardly to receive a depending annular control flange 44 formed on the mounting plate 24. As shown, perhaps best in FIGURE 2, the annular chamber 42 is intersected by a series of radially aligned and circumferentially equispaced inlets 46 and outlets 48. The inlets 46 are connected by supply passages 50 to the air supply 34, whereas the outlets 48 communicate with delivery passages 52 each extending to a comparator viewed at 54. The supply passages 50 each communicate with an accumulator 56 that serves somewhat as a storage area for removing pressure fluctuations that might result from time to time, e.g., due to inadequacies in the air supply 34.

As will be further discussed in the operational summary, the disposition of the annular control flange 44 relative to the various inlets 46 and outlets 48 determines what pressure differentials are developed therebetween. For example, with a minimum interference to flow by the flange 44 a minimum pressure drop will occur while a maximum interference will produce a corresponding maximum pressure differential. The resultant output pressures in the delivery passages 52, therefore, reflect the tilt of the mounting plate 34 at the corresponding input 46 and output 48. As displayed in FIGURE 2, there are thirty-six sets of inputs 46 and outputs 48 arranged every 10°. More or fewer sets can, of course, be used.

The comparator 54 operates on the manometric principle and involves a series of thirty-six tubes 58, one for each set of inputs 46 and outputs 48. For example, the input-output set at 10° in FIGURE 1 will communicate by the delivery passage 52, with the tubes 58 having the some identification, i.e., 10°, along an angle of unbalance scale 60 at the upper part of the tubes 58. These tubes 58 may each contain some fluid medium, such as mercury, and have their upper ends either exposed to atmospheric pressure or sealed so as to provide a vacuum pressure. Then in a well-known way, the pressure in the individual delivery passages 52 will be compared with either the atmospheric pressure or the vacuum pressure and cause the mercury in the corresponding tubes 58 to assume a level reflecting the pressure at the designated set of inputs 46 and outputs 48. By proper calibration, an ounce-inch scale 62 can accurately indicate the amount of static unbalance. Actually, as seen in the drawing, the levels of the mercury in the various tubes 58 portray a sine curve. The amplitude of this curve indicates the amount of unbalance, while the point of peak amplitude locates the angle of this unbalance. In the illustration the unbalance occurs at 180°. The amount of unbalance is .2 ounce-inch.

The operational efficiency of the apparatus is further facilitated by a dampener shown generally at 64. The dampener 64 includes a chamber 66 for a suitable dampening medium, such as silicon fluid. Immersed in this silicon fluid is a vane 68, which is connected to a lower platform 70. The lower platform 70 is connected to the mounting plate 24 by a series of rods 72, preferably three, which extend through suitable openings 74 in the horizontal upper platform 18. Operationally, any sudden movements of the mounting platform 24 are inhibited in a known way by the resistance afforded by the silicon fluid to the movement of the vane 68.

Summarizing now the operation, it should be kept in mind that all like workpieces 10 should be placed in the same position on the mounting plate 24. Therefore, counterweights, such as that illustrated at 76, may be positioned to gain horizontal calibrating alignment of the mounting plate 24 with some type of master workpiece. Thereafter, each workpiece 10 will be placed in the same position on the mounting plate 24 as the master workpiece. The heavy side of the workpiece 10 will cause the mounting plate 24 to tilt downwardly and, of course, the set of inputs 46 and outputs 48 immediately below the heaviest part of the workpiece 10 will produce the greatest pressure differential because this is the point of maximum interference with fluid flow. If this should coincide with the 180° mark, then the mercury in the corresponding tubes 58 will have the highest elevation, as illustrated, and usually indicate the angular location of this point. The sets of inputs 46 and outputs 48 on each side of the set at 180°, of course, will have pressure differentials that gradually diminish. The pressures at all these points can be compared by observing the angle of unbalance and the amount of unbalance scales 60 and 62. Of course, if the type of workpiece 10 is changed then a recalibration is necessary.

As will now be appreciated, a very simple and uncomplicated way of ascertaining static unbalance has been described and one that virtually eliminates friction from the unbalance determination. The comparator 54 for determining the different pressures at the various points is advantageously used to give a visual portrayal of both the disposition and amount of static unbalance.

The invention is to be limited only by the following claims.

What is claimed is:

1. In combination, a workpiece support, means universally pivoting the support about an axis thereof, means sensing deflection of the support and developing a corresponding fluid pressure, the deflection sensing means including a source of fluid under pressure, a series of passages each communicating with the source and spaced apart and so related to the support axis that each corresponds to a certain angular location on the support, and means associated with the support for varying the pressure in the passages according to the deflection of the support, and means responsive to the pressure variations in each passage and calibrated according to the angular location of the passages so as to indicate the angular location of the deflection throughout a 360° range and the amount of deflection.

2. In combination, a support deflectable about an axis thereof, the support including a control portion, means sensing movement of the support for developing a corresponding fluid pressure, a source of fluid pressure, a series of fluid passages each communicating with the source, the series of passages being spaced apart and so related to the support axis that each corresponds to a certain angular location on the support and being so arranged relative to the control portion of the support that the pressure in each is varied by the control portion in accordance with a characteristic of the deflection of the support, and means utilizing the pressure variations in each passage and calibrated to indicate the deflection of the support.

3. In combination, a universally pivoted support having a control portion, means sensing movement of the support and developing fluid pressure reflecting a characteristic of the movement, the sensing means including a source of fluid under pressure, a fluid transfer member disposed proximate the support and including a chamber therein having a series of circumferentially spaced and aligned inlets and outlets, the inlets each being connected to the source, the control portion on the support being so arranged within the chamber as to alter the pressure differential between the inlets and the outlets in accordance with the angular disposition of the support and the amount of deflection, and means communicating with the outlet and responsive to the pressures therein to indicate the angular disposition of the support and the amount of deflection thereof.

4. In combination, a universally pivotal support including an annular control flange, means sensing movement of the support, the sensing means including a source of fluid under pressure, a transfer member having a series of circumferentially spaced and aligned inlets and outlets, the inlets communicating with the source, the control flange of the support being so arranged within the chamber as to alter the pressure differential between the inlets and the outlets in accordance with the angular disposition of the support and the amount of deflection, and comparator means including a series of manometer tubes each communicating with one of the outlets and so calibrated as to visually indicate the angular disposition of the support and the amount of deflection thereof.

5. In apparatus for determining the unbalance in a workpiece, the combination of a workpiece support angularly movable about an axis thereof, means sensing angular movement of the support by the workpiece, the sensing means including a source of fluid pressure, a series of passages each communicating with the source and spaced apart and so related to the support axis that each corresponds to a certain angular location on the support, means carried by the support for altering the flow through the passages so that the fluid pressure reflects the angular disposition of the support, and means responsive to the fluid pressure in each passage for indicating a characteristic of the static unbalance in the workpiece.

6. In apparatus for determining the unbalance in a workpiece, the combination of a workpiece support universally pivotal about an axis thereof, means sensing pivotal movement of the support by the workpiece, the sensing means including a source of fluid pressure, a series of passages each communicating with the source and spaced about the support axis so that each corresponds to a certain angular location on the support, and means associated with the support for varying the fluid pressure in the passages according to the angular disposition of the support, and means responsive to the fluid pressure variations for indicating a characteristic of the static unbalance in the workpiece.

7. In apparatus for determining the unbalance in a workpiece, the combination of a workpiece support universally pivotal about an axis thereof, the support including a control portion, means sensing the angular disposition of the support due to static unbalance in the workpiece, the sensing means including a source of fluid under pressure, a series of fluid passages each communicating with the source, the series of passages being spaced apart about the axis of the support so that each corresponds to a certain angular location on the support, and being so arranged relative to the control portion as to have the pressures therein varied in accordance with the disposition of the associated part of the support, and means utilizing the pressures in the passages for indicating a characteristic of the static unbalance in the workpiece.

8. In apparatus for determining the unbalance in a workpiece, the combination of a workpiece support having an annular control flange thereon, means universally pivoting the support, means sensing the angular disposition of the support, the sensing means including a source of fluid pressure, a transfer member having an annular chamber therein arranged to receive the control flange on the workpiece support, the annular chamber having an input connected to the source and an output, the control flange being so arranged relative to the chamber and the inlet and the outlet as to vary the pressure thereacross in accordance with the angular disposition of the support at a series of circumferentially spaced points, and means sensing the pressures at the spaced points for indicating the amount of static unbalance in the workpiece and the angular disposition thereof.

9. In apparatus for determining the unbalance in a workpiece, the combination of a workpiece support including an annular depending flange, means universally pivoting the support, means sensing pivotal movement of the support, the sensing means including a source of fluid under pressure, a transfer member having an annular chamber so arranged as to receive the depending annular flange of the support, the annular chamber having a series of radially aligned inlets and outlets circumferentially and equally spaced thereabout, the inlets communicating with the source, the control flange causing the pressure between the inlets and the outlets to be varied in accordance with the tilt of the support produced by static unbalance in the workpiece, and pressure responsive means including a series of manometer tubes each communicating with one of the outlets so as to provide a visual display of the pressures, the manometer tubes being so calibrated as to indicate the amount of the static unbalance and the angular location thereof.

References Cited by the Examiner

UNITED STATES PATENTS

| | | | |
|---|---|---|---|
| 2,428,345 | 9/1947 | Turner | 74—5.6 |
| 2,821,859 | 2/1958 | Crockett | 74—5.6 |
| 2,921,595 | 1/1960 | Erbguth | 137—85 |
| 3,098,392 | 7/1963 | Mika | 73—485 |
| 3,139,758 | 7/1964 | Lahde | 74—5.6 |

RICHARD C. QUEISSER, *Primary Examiner.*

J. J. GILL, *Assistant Examiner.*